United States Patent
Luo et al.

(10) Patent No.: US 9,379,894 B1
(45) Date of Patent: Jun. 28, 2016

(54) AUTHENTICATION USING CRYPTOGRAPHIC VALUE DERIVED FROM A SHARED SECRET OF A NEAR FIELD COMMUNICATION TAG

(71) Applicant: EMC Corporation, Hopkinton, MA (US)

(72) Inventors: Guoying Luo, Lexington, MA (US); Ari Juels, Brookline, MA (US); Yong Qiao, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 70 days.

(21) Appl. No.: 13/917,112

(22) Filed: Jun. 13, 2013

(51) Int. Cl.
G06F 7/04 (2006.01)
H04L 9/32 (2006.01)

(52) U.S. Cl.
CPC .............. *H04L 9/321* (2013.01); *H04L 9/3213* (2013.01)

(58) Field of Classification Search
CPC ..... H04W 4/008; H04W 12/06; H04W 12/04; H04L 63/0838; H04L 63/08; H04L 63/0823; H04L 63/0428; H04N 21/25816; G06F 2221/2129; G06F 21/6218
See application file for complete search history.

(56) References Cited

U.S. PATENT DOCUMENTS

| | | | | |
|---|---|---|---|---|
| 7,861,082 B2 * | 12/2010 | Pinder | ................... | H04N 7/162 713/168 |
| 8,478,196 B1 * | 7/2013 | Hewinson | ............ | H04B 5/0031 235/379 |
| 2008/0065892 A1 * | 3/2008 | Bailey | ................. | H04L 63/0492 713/171 |
| 2011/0212707 A1 | 9/2011 | Mahalal | | |
| 2012/0023567 A1 * | 1/2012 | Hammad | ............... | G06Q 20/12 726/9 |
| 2012/0185697 A1 | 7/2012 | Buer | | |
| 2013/0225081 A1 * | 8/2013 | Doss | ..................... | H04W 4/206 455/41.2 |

OTHER PUBLICATIONS

Yubico, "Technical Description," www.yubico.com/products/yubikey-hardware/yubikey-neo/technical-description/, 2013, 2 pages.
Hot for Security, "Android Key Fob Secures Online Authentication Via NFC," www.hotforsecurity.com/blog/android-key-fob-secures-online-authentication-via-nfc-3222.html, Jan. 2013, 4 pages.
Gluu, "USB & NFC Hard Token Authentication, Gluu Integrates YubiKey for Secure Hard Token Two-Factor Authentication," www.gluu.org/two-factor-authentication-security/yubikey/, 2013, 3 pages.
Ideas Project, "NFC Authentication," https://ideasproject.com/idea/-/ideas/648113; jsessionid=DEE62C749EDCBC0F7F13EE3E149CFA, 2012, 4 pages.

(Continued)

*Primary Examiner* — Shewaye Gelagay
*Assistant Examiner* — Carlton Johnson
(74) *Attorney, Agent, or Firm* — Ryan, Mason & Lewis, LLP

(57) ABSTRACT

An apparatus comprises a first processing device comprising near field communication (NFC) interface circuitry, a memory and a processor coupled to the memory. The first processing device is configured to establish an NFC connection with an NFC tag using the NFC interface circuitry, receive a shared secret established between the NFC tag and an authentication server in an authentication protocol, and present a cryptographic value derived from the shared secret to a second processing device. The cryptographic value is utilizable by the second processing device for authenticating to the authentication server.

22 Claims, 6 Drawing Sheets

(56) References Cited

OTHER PUBLICATIONS

Vijayakrishnan Pasupathinathan, "Hardware-Based Identification and Authentication Systems," Macquarie University, Faculty of Science, Thesis for the Degree of Doctor of Philosophy, Department of Computing, Dec. 2009, 204 pages.

G. Alpár et al., "Using NFC Phones for Proving Credentials," 16th International GI/ITG Conference on Measurement, Modelling, and Evaluation of Computing Systems and Dependability and Fault Tolerance (MMB/DFT), Mar. 2012, pp. 317-330, Kaiserslautern, Germany.

* cited by examiner

AUTHENTICATION USING CRYPTOGRAPHIC VALUE DERIVED FROM A SHARED SECRET OF A NEAR FIELD COMMUNICATION TAG

FIELD

The present invention relates generally to cryptography, and more particularly to authentication techniques.

BACKGROUND

Near field communication (NFC) is a set of standards for smartphones and other processing devices for establishing radio communication with one another by touching them together or bringing them into close proximity, typically on a range of a few centimeters. NFC operates at 13.56 MHz on the International Organization for Standardization (ISO)/International Electrotechnical Commission (IEC) 18000-3 air interface at rates ranging from approximately 106 kbit/s to 424 kbits/s. NFC typically involves an initiator and a target. In some arrangements, the initiator actively generates a radio frequency (RF) field that powers a passive target. This allows NFC targets to take very simple form factors that do not require batteries.

An NFC target may comprise a microchip with small aerials which is capable of storing a small amount of information for transfer to an NFC initiator. Devices with NFC capability are becoming generally available. Examples of such devices include smartphones, tablets, laptops and other computing and processing devices.

SUMMARY

In one embodiment, an apparatus comprises a first processing device comprising NFC interface circuitry, a memory and a processor coupled to the memory. The first processing device is configured to establish an NFC connection with an NFC tag using the NFC interface circuitry, receive a shared secret established between the NFC tag and an authentication server in an authentication protocol, and present a cryptographic value derived from the shared secret to a second processing device. The cryptographic value is utilizable by the second processing device for authenticating to the authentication server.

In another embodiment, an apparatus comprises a first processing device comprising a memory and a processor coupled to the memory. The first processing device is configured to obtain a cryptographic value from a second processing device and utilize the cryptographic value in authenticating to an authentication server. The cryptographic value is derived from a shared secret established between the authentication server and an NFC tag connected to the second processing device using an NFC connection.

These and other features and advantages of embodiments of the present invention will become more readily apparent from the accompanying drawings and the following detailed description.

DETAILED DESCRIPTION

Figure 1:
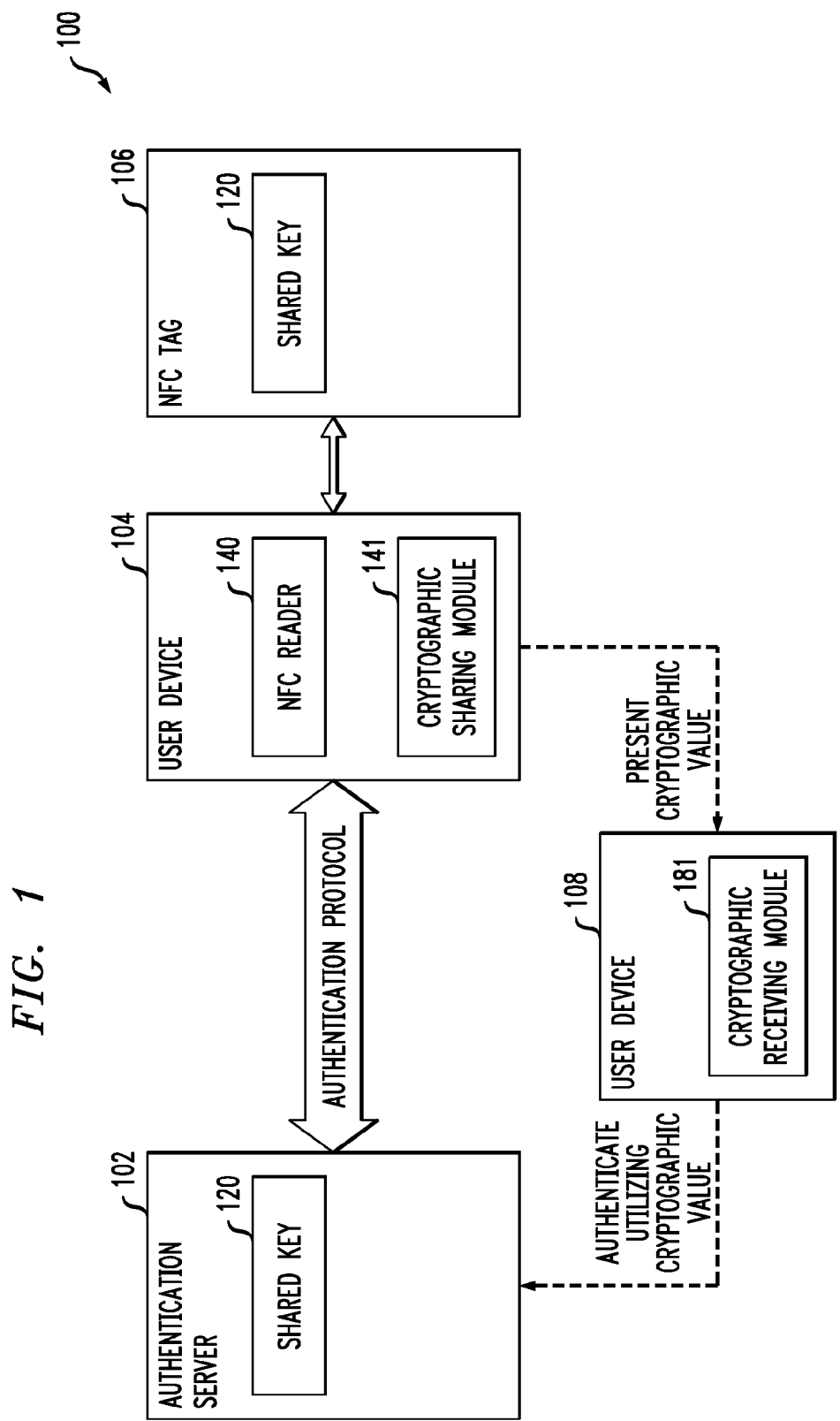
FIG. 1 is a block diagram of a communication system implementing authentication using a cryptographic value derived from a shared secret of an NFC tag in an illustrative embodiment of the invention.

Illustrative embodiments of the present invention will be described herein with reference to exemplary communication systems and associated servers, NFC devices and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

Cryptographically capable NFC tags support strong mutual authentication between the tag and a tag reader. The term "NFC tag" as used herein is intended to be construed broadly to encompass any device with NFC capability. A device with NFC capability may be a standalone NFC device, a device with NFC circuitry embodied therein, a device with removable NFC circuitry, etc. An NFC tag may take on a variety of form factors, which include but are not limited to form factors such as a card, sticker, key fob and various other small and lightweight processing devices. Other more complex processing devices such as smartphones and tablets, or portions thereof, may be considered NFC tags as that term is broadly used herein.

Embodiments of the invention enable a user to authenticate to a remote server on a primary device that does not have or is not associated with an NFC tag by utilizing a secondary device which can act as an NFC reader and connect to the NFC tag. The secondary device, on receiving a shared secret from the NFC tag, can display or otherwise present a cryptographic value for use by the primary device in authenticating to a remote server. The cryptographic value may be a passcode. The term "passcode" as used herein is intended to be construed broadly to include a one-time passcode (OTP), a multiple-use passcode, a personal identification number (PIN), an alphanumeric value, an image, a barcode, etc. which may be used for authenticating to a remote server.

The secondary device may present the passcode to a primary device by displaying the passcode on a display of the secondary device. A user of the primary device can read the passcode from the display of the secondary device and manually type or otherwise enter the passcode into the primary device for use in authenticating to a remote server The secondary device may alternately present the passcode to the primary device via a network connection between the primary and secondary devices. For example, the primary and secondary devices may establish a Bluetooth connection with one another for transmission of the passcode.

For added security and/or convenience, the length or complexity of the passcode which is presented to the primary device may be based on a mode of the primary and secondary devices. In a connected mode, where the primary and secondary devices are connected using a network connection such as a Bluetooth connection, the passcode may be relatively long. In an unconnected mode, where the primary and secondary devices are not connected over a network connection, the passcode may be relatively short since the user must manually enter the passcode into the primary device by reading a display of the secondary device. In some instances, the primary and secondary devices may be in a connected mode but a user may still request that the passcode be relatively short for presentation on a display of the secondary device. For example, the network connection between the primary and secondary devices in these instances maybe untrusted or unsecured, and thus a user may prefer that the passcode be presented on a display rather than being transmitted over the unsecure or untrusted network connection.

FIG. 1 illustrates a communication system 100 implementing authentication using a cryptographic value derived from a secret received from an NFC tag. The communication system 100 includes an authentication server 102, a user device 104, an NFC tag 106 and a user device 108. The user device 108 is an example of the primary device described above, while the user device 104 is an example of the secondary device described above. It is to be appreciated, however, that a given user device such as user device 104 may be a primary device in some instances and a secondary device in other instances. For example, a plurality of user devices with associated NFC tags may communicate with a plurality of authentication servers. A given user device may in some instances present passcodes to one or more other ones of the plurality of user devices for authenticating to a particular authentication server. In other instances, the given user device may receive a passcode which is presented by one or more other user devices for use in authenticating to one or more other authentication servers. Thus, while FIG. 1 for clarity shows only single instances of an authentication server, primary and secondary devices, and NFC tag, embodiments of the invention are not limited solely to this arrangement.

In addition, while FIG. 1 shows the user device 104 and NFC tag 106 as physically separate, it should be noted that embodiments are not limited to this arrangement. For example, the user device 104 and the NFC tag 106 need not be physically distinct. For example, the user device 104 may be a smartphone and the NFC tag 106 may be a sticker or other circuitry which is attached to or embodied within a physical casing of the smartphone.

The user device 104 is configured to perform an authentication protocol with the authentication server 102 using the NFC tag 106. The user device 104 comprises an NFC reader 140, and is configured to perform the authentication protocol responsive to a user tapping or otherwise activating the NFC tag 106. The NFC tag 106 and the authentication server 102 have a shared key 120. The NFC tag 106 authenticates to the authentication server 102 and establishes a shared secret as part of the authentication protocol. The NFC tag 106 can provide the shared secret to the authentication server 102 to authenticate itself to the authentication server 102.

Embodiments of the invention may utilize the shared secret established by the NFC tag 106 in the authentication protocol to derive a passcode for presentation to the user device 108, with the passcode being utilizable by the user device 108 for authentication to the authentication server 102. The user device 108 may be a device which does not contain an NFC reader. In other embodiments, the user device 108 may contain an NFC reader but may not be associated with or may be unable to establish an NFC connection with the NFC tag 106.

By way of example, the user device 108 may not be in close physical proximity to the NFC tag 106 as required for establishing an NFC connection with a particular NFC tag such as the NFC tag 106.

The user device 104 comprises a cryptographic sharing module 141. The cryptographic sharing module can comprise hardware, software or combinations of hardware and software which may be utilized for presenting a cryptographic value such as a passcode to the user device 108. The user device 108 comprises a cryptographic receiving module 181 comprising hardware, software or combinations of hardware and software which may be utilized for obtaining a cryptographic value such as a passcode from the user device 104.

Figure 2:
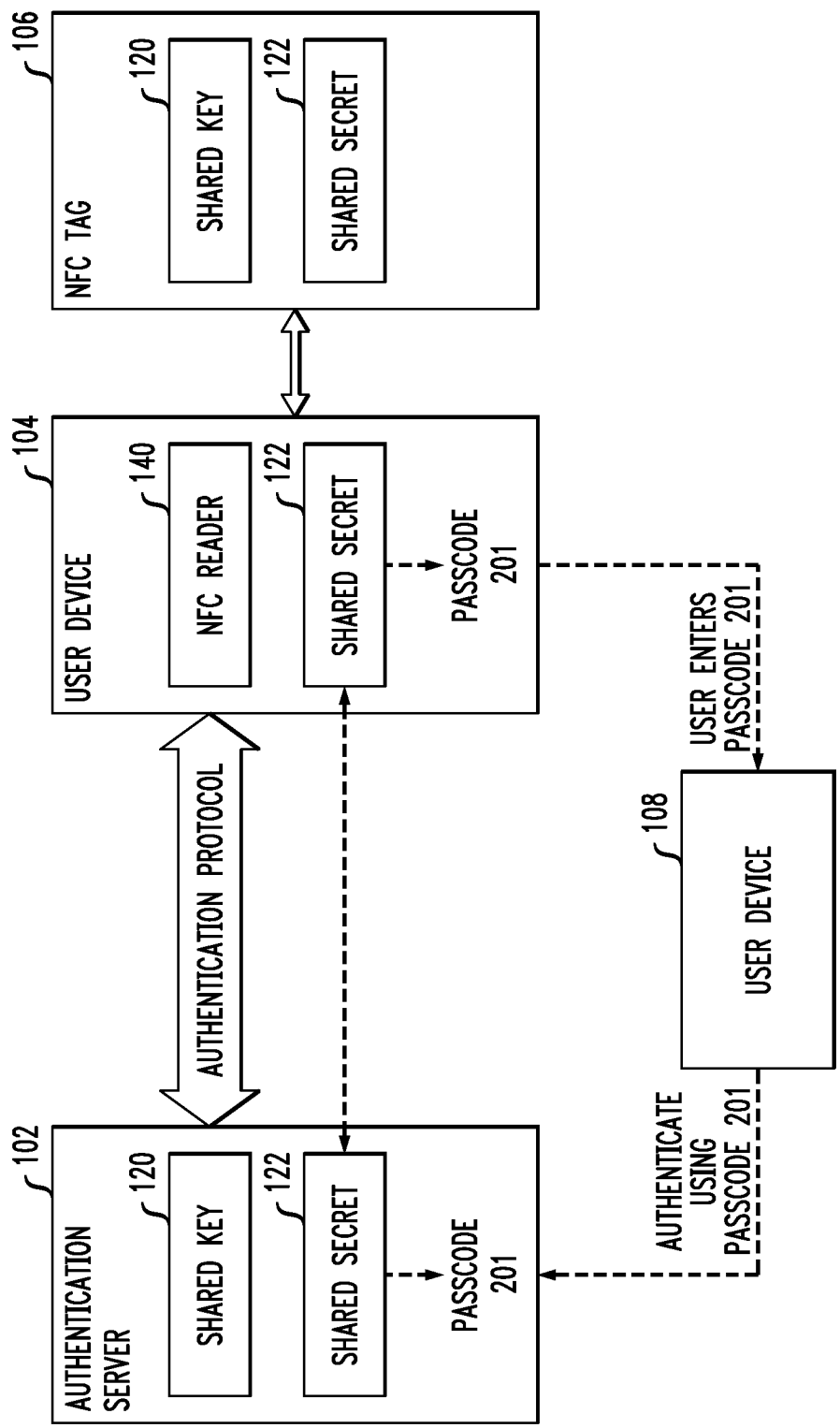
FIG. 2 shows an authentication process carried out in the communication system of FIG. 1 in an illustrative embodiment of the invention.

FIG. 2 illustrates an authentication process which may be carried out in the communication system 100 of FIG. 1. The user device 104 and authentication server 102 carry out an authentication protocol using the NFC tag 106. The authentication protocol may be, by way of example, a challenge/response authentication. A wide variety of other authentication protocols may alternatively be utilized. Examples of conventional authentication protocols are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The NFC tag 106 and authentication server 102 each have a shared key 120 stored in a memory therein. The shared key 120 may be pre-provisioned in the NFC tag 106, or may be established during an authentication protocol with the authentication server 102. The shared key 120 may be utilized for encrypting messages or other communications between the authentication server 102 and the NFC tag 106 in the authentication protocol.

A shared secret 122 is established during the authentication protocol. As shown in FIG. 2, the user device 104 uses the shared secret 122 to derive a passcode 201. The user device 104 presents passcode 201 to the user device 108. The user device 104 may output the passcode 201 on a display of the user device 104, such that a user of the user device 108 can input the passcode 201 on the user device 108. The user device 108 can then authenticate to the authentication server 102 using the passcode 201.

It is important to note that while FIG. 2 shows the user device 104 deriving the passcode 201 from the shared secret 122, embodiments of the invention are not limited to this arrangement. In some embodiments, the NFC tag 106 may derive the passcode 201 from the shared secret 122 and transmit the passcode 201 over the NFC connection with the user device 104. The user device 104 can then present the passcode 201 received from the NFC tag 106 to the user device 108. In the authentication process of FIG. 2, the passcode 201 may be relatively short, for example an 8-digit number, such that it is easy for a user to enter it into the user device 108. It is important to note, however, that the passcode 201 is not limited solely to 8-digit numbers. Instead, as discussed above, the passcode 201 may be one of or a combination of formats, including PINs, images, alphanumeric sequences of varying lengths, etc.

Figure 3:
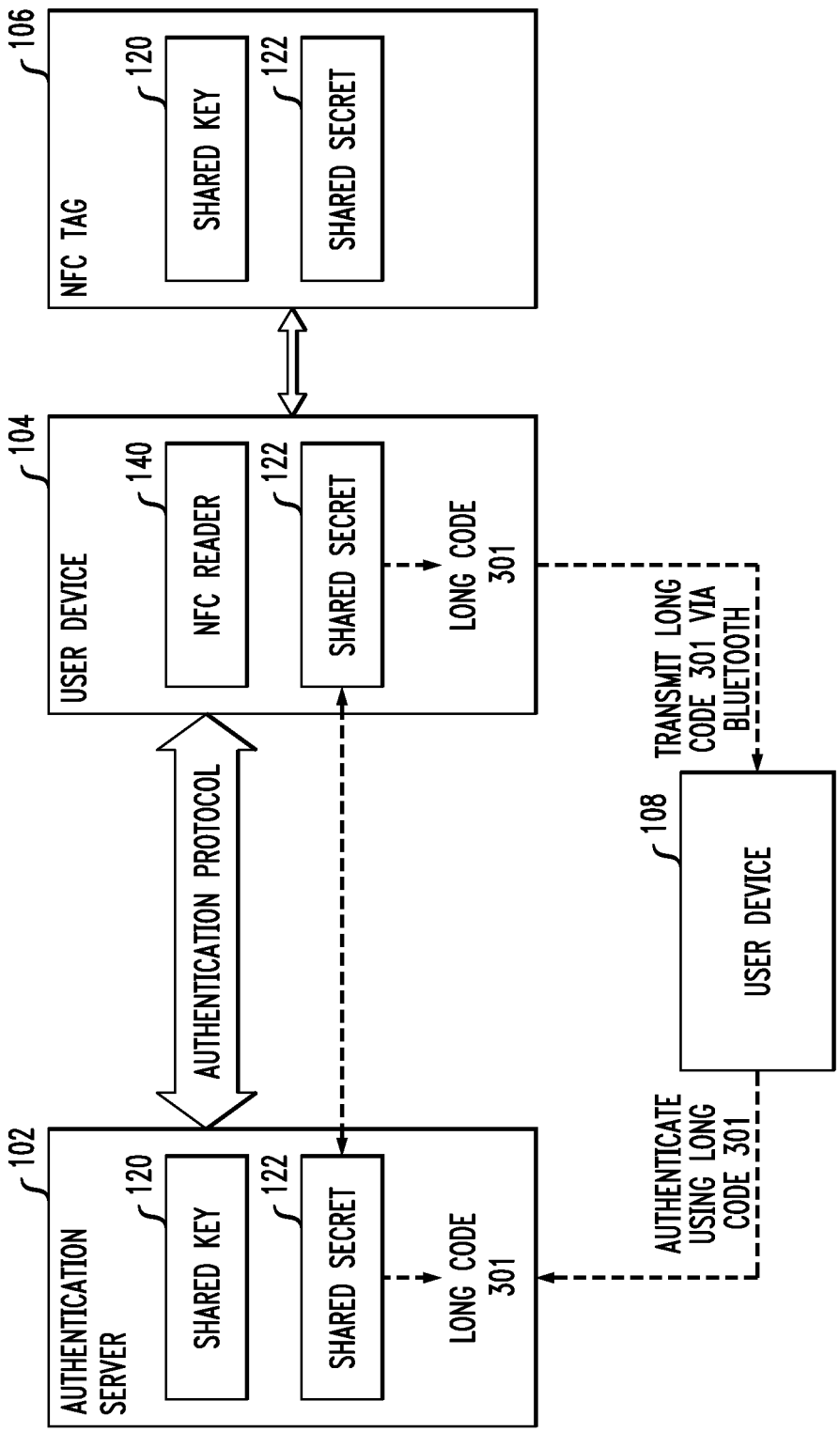
FIG. 3 shows another authentication process carried out in the communication system of FIG. 1 in an illustrative embodiment of the invention.

FIG. 3 illustrates another authentication process which may be carried out in the communication system 100 of FIG. 1. The user device 104 and authentication server 102 carry out an authentication protocol using the NFC tag 106. A shared secret 122 is established during the authentication protocol. The user device 104 uses the shared secret 122 to derive a long code 301, which is presented to the user device 108.

The user device 104 may transmit the long code 301 to the user device 108 over a network connection established between the user device 104 and the user device 108. The network connection may be, for example, a Bluetooth connection. It is important to note, however, that various other network connections may be utilized to transmit the long code 301 such as a WiFi, cellular or other wireless connection, a wired Ethernet connection, a universal serial bus (USB) connection, etc.

The long code 301, as contrasted with the passcode 201, may be relatively long and/or complex. As discussed above, the passcode 201 may be a short 8-digit number. The long code 301 may be, by way of example, an alphanumeric sequence of several hundred or several thousand digits, a certificate, a digital signature, etc. The long code 301 would be impractical for a user to manually enter or type in to the user device 108, but is practical to transmit over a network connection between the user device 104 and the user device 108.

Although FIG. 3 shows the user device 104 deriving the long code 301 from the shared secret 122, embodiments are not limited to this arrangement. In some embodiments, the NFC tag 106 may derive the long code 301 from the shared secret and transmit the long code 301 over the NFC connection with the user device 104. The user device 104 can then present the long code 301 to the user device 108 over the network connection established between the user device 104 and the user device 108.

Figure 4:
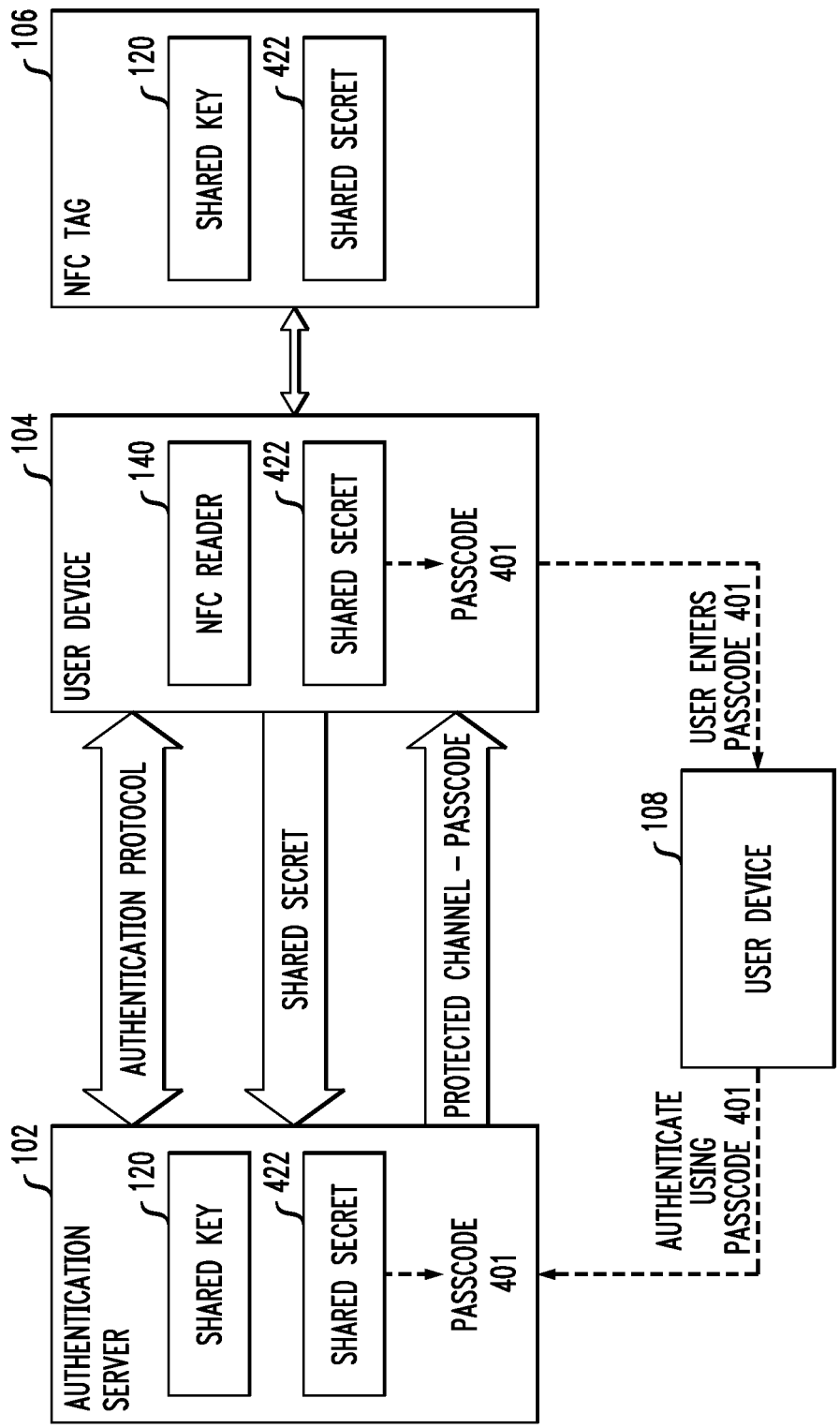
FIG. 4 shows another authentication process carried out in the communication system of FIG. 1 in an illustrative embodiment of the invention.

FIG. 4 illustrates another authentication process which may be carried out in the communication system 100 of FIG. 1. Again, the user device 104 carries out an authentication protocol with the authentication server 102 using the NFC tag 106. Messages and other communications exchanged between the authentication server 102 and the NFC tag 106 may be encrypted using the shared key 120. During the authentication protocol, the authentication server 102 and NFC tag 106 independently generate a shared secret 422. The NFC tag 106 presents the shared secret 422 to the user device 104, which in turn presents the shared secret 422 to the authentication server 102. If the authentication server 102 determines that the shared secret received from the user device 104 matches the shared secret 422 generated by the authentication server 102, the authentication server generates a passcode 401. The authentication server 102 then sends the passcode 401 to the user device 104 over a protected channel established during the authentication protocol.

The user device 104, on receiving the passcode 401, presents the passcode 401 to the user device 108. The user device 108 uses the passcode 401 to authenticate to the authentication server 102. The passcode 401 may be a relatively short passcode similar to the passcode 201 or may be a relatively long passcode similar to the long code 301. The length or complexity of the passcode 401 may be determined based on whether the user device 104 and the user device 108 are in the connected mode as described above.

Figure 5:
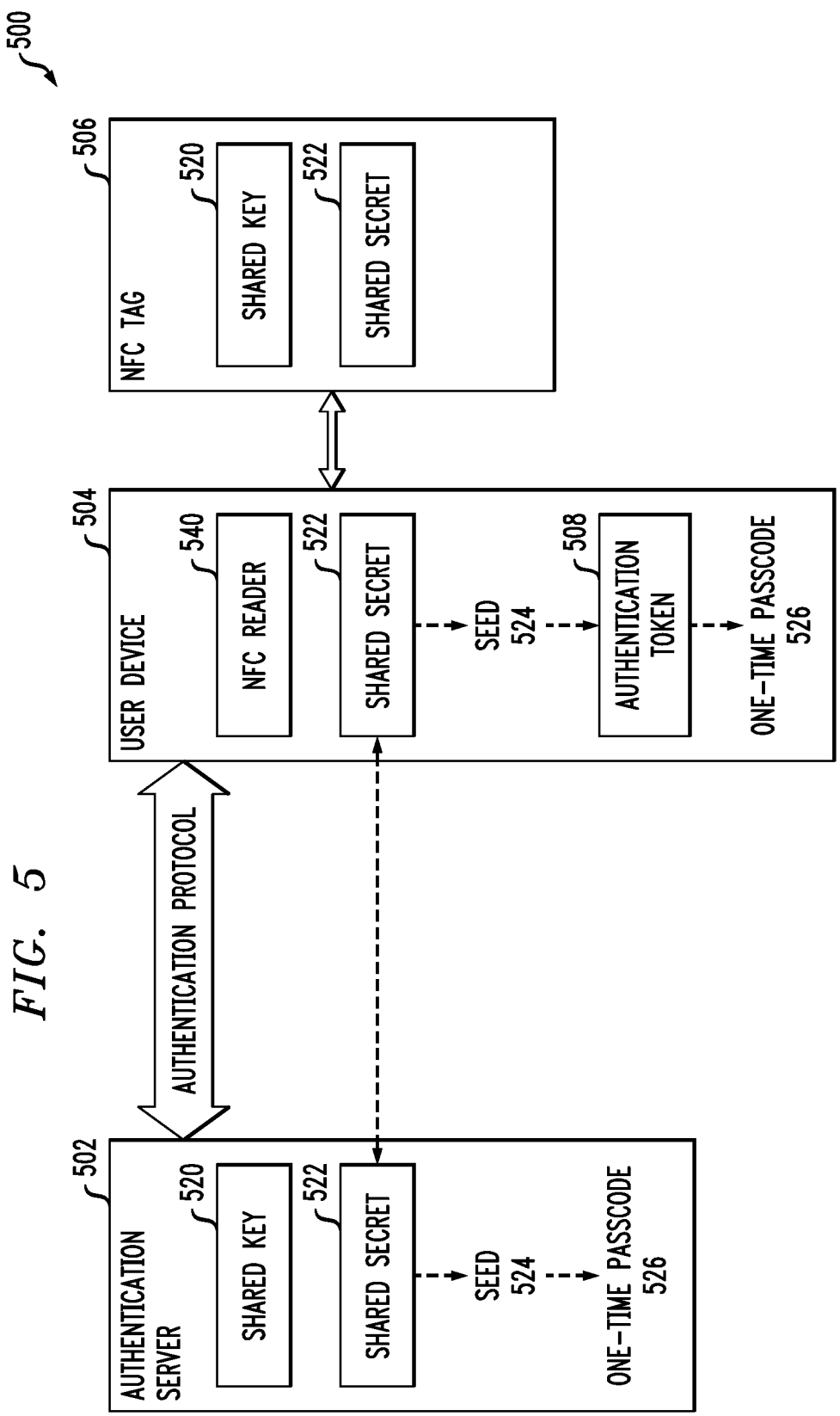
FIG. 5 shows re-seeding of an authentication token using a secret of an NFC tag in an illustrative embodiment of the invention.

FIG. 5 illustrates re-seeding of an authentication token 508 using a secret received from an NFC tag 506 in a communications system 500. The communication system 500 includes an authentication server 502, user device 504, NFC tag 506 and an authentication token 508. The authentication token 508 is an example of a primary device as described above and the user device 504 is an example of a secondary device as described above.

The user device 504 comprises an NFC reader 540 capable of establishing an NFC connection with the NFC tag 506. Authentication server 502 carries out an authentication protocol with NFC tag 506 using the user device 504. The authentication server 502 and the NFC tag 506 each have a shared key 520 stored in a memory therein. The shared key 520 may be utilized for encrypting messages and other communications in the authentication protocol.

The authentication server 502 and NFC tag 506 establish a shared secret 522 as part of the authentication protocol. The shared secret 522 is communicated to the user device 504 after a successful authentication protocol. The shared secret 522 is used to derive a seed 524, which is provided to authentication token 508. The authentication token 508 may be a hardware token that is connected to, embodied within, or otherwise associated with the user device 504. The authentication token 508 can be re-seeded with the seed value 524.

The authentication token 508 can subsequently utilize the seed value 524 for generating OTP 526. The authentication server 502, which also has knowledge of the seed value 524, may similarly generate the OTP 526. The user device 504 can utilize the OTP 526 for authenticating to the authentication server 502. The authentication token 508 may display the OTP 526 on a display of the authentication token, or otherwise present the OTP 526 to the user device 504. The authentication token 508 may also be a software authentication token implemented in a smartphone, tablet or other processing device.

The authentication token 508 may additionally or alternatively provide the OTP 526 to one or more other processing or computing devices not shown in FIG. 5. These other processing and computing devices may utilize the OTP 526 for authenticating to the authentication server 502. The authentication token 508 may also be physically removable from the user device 504. A user may connect or otherwise associate the authentication token 508 with the user device 504 for re-seeding only. By way of example, the authentication token 508 may be used normally with a processing or other computing device which does not have NFC capability. The user may temporarily connect or associate the authentication token 508 with the NFC-capable user device 504 to easily re-seed the authentication token 508.

The authentication token 508 may be a time-synchronous or event-synchronous token. One particular example of a time-synchronous authentication token is the RSA SecurID® user authentication token, commercially available from RSA, The Security Division of EMC Corporation, of Bedford, Mass., U.S.A. The authentication token 508 may by an RSA SecurID® authentication token, suitably modified to function as described herein. The authentication token may alternatively comprise a hybrid time-synchronous and event synchronous token, or various other token types. The authentication token 508 may interface with the user device 504 using a wired connection such as a USB interface. The authentication token 508 may alternately comprise a wireless authentication token.

Figure 6:
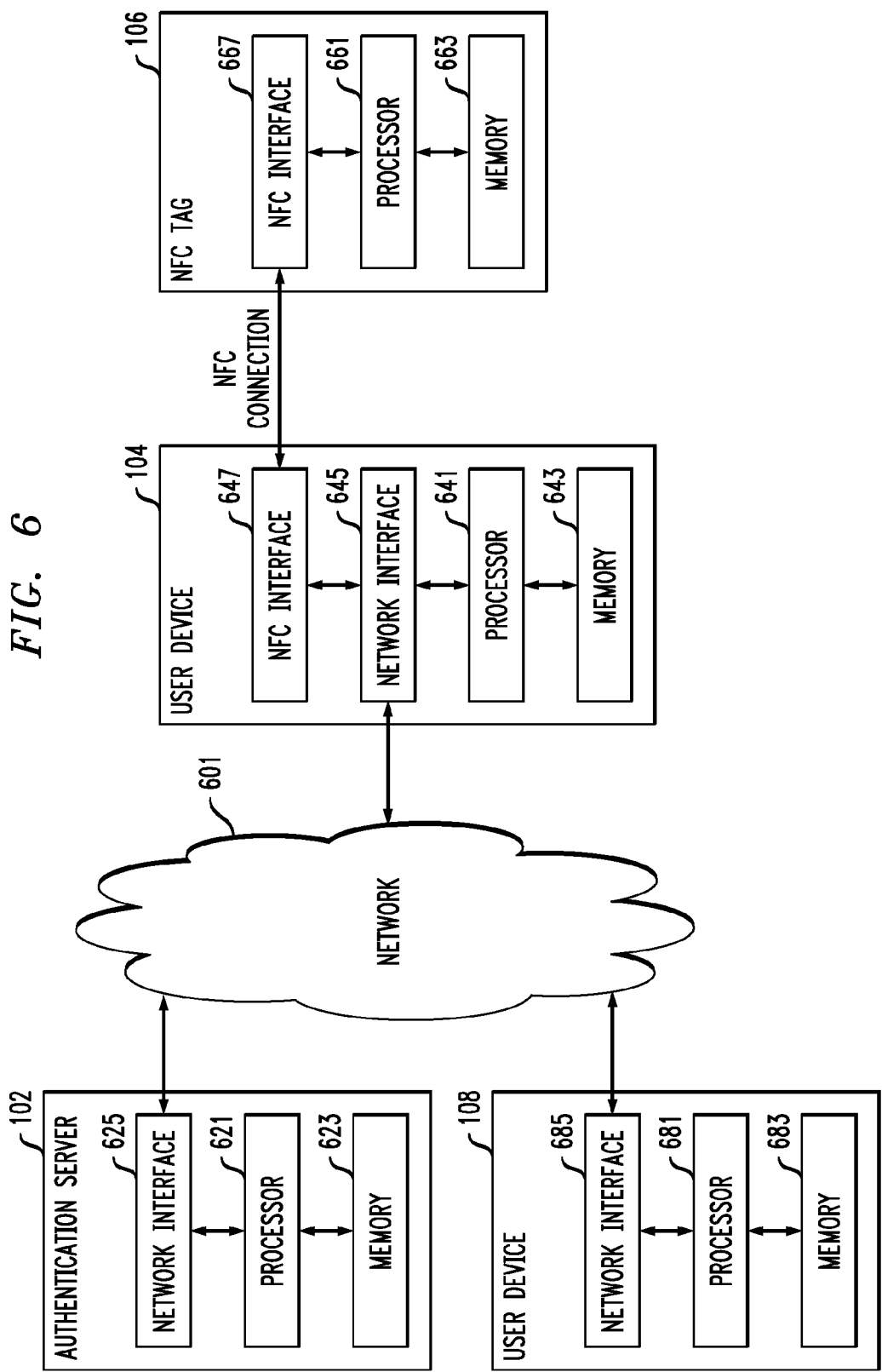
FIG. 6 shows one possible implementation of the FIG. 1 system in an illustrative embodiment of the invention.

FIG. 6 shows one possible implementation of the FIG. 1 system. FIG. 6 shows the authentication server 102, user device 104 and user device 108 connected over a network 601. The user device 104 is also connected to NFC tag 106 using an NFC connection. The user devices 104 and 108, a described above, may be implemented as respective processing devices. A given such processing device may comprise, for example, a computer, a mobile telephone or other type of communication device.

Authentication server 102 comprises a processor 621 coupled to a memory 623 and a network interface 625. The processor 621 may comprise a microprocessor, a microcontroller, an application-specific integrated circuit (ASIC), a field-programmable gate array (FPGA) or other type of processing circuitry, as well as portions or combinations of such circuitry elements. The memory 623 may comprise random access memory (RAM), read-only memory (ROM) or other types of memory, in any combination.

The memory 623 and other memories disclosed herein may be viewed as examples of what are more generally referred to as "computer program products" storing executable computer program code.

Also included in the authentication server 102 is network interface circuitry 625. The network interface circuitry 625 allows the authentication server 102 to communicate over the network 601 with the user devices 104 and 108, and may comprise one or more conventional transceivers.

The user devices 104 and 108 comprise respective processors 641 and 681 which are coupled to respective memories 643 and 683. The processors 641 and 681, like processor 621 in authentication server 102, may comprise a microprocessor, a microcontroller, an ASIC, an FPGA or other type of processing circuitry, as well as portions or combinations of such circuitry elements, and the memories 643 and 683 may comprise RAM, ROM or other types of memory, in any combination.

Also included in the user devices 104 and 108 are respective network interface circuitry 645 and 685. The network interface circuitry 645 and 685 permit the user devices 104 and 108 to communicate over the network 601 with the authentication server 102 and other user devices, servers, etc. not shown in FIG. 6. The network interface circuitry 645 and 685 may comprise one or more conventional transceivers.

The user device 104 further comprises NFC network interface circuitry 647. The NFC tag 106 also comprises NFC interface circuitry 667, permitting the user device 104 and the NFC tag 106 to establish an NFC connection.

The NFC tag 106 further comprises a processor 661 coupled to a memory 663. The processor 661 may comprise a microprocessor, a microcontroller, an ASIC, an FPGA or other type of processing circuitry, as well as portions or combinations of such circuitry elements, and the memory 663 may comprise RAM, ROM or other types of memory, in any combination. The NFC tag 106 may be implemented as a lightweight processing device with limited processing power. The NFC tag 106 may be configured to draw its power from the NFC field established in the NFC connection with the user device 104.

The network 601 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

It is to be appreciated that the particular set of elements shown in FIG. 6 is presented by way of example, and in other embodiments additional or alternative elements may be used. Thus, another embodiment may include additional networks and additional sets of user devices, servers and NFC tags.

As mentioned previously, various elements of the communication system 100 such as user devices, authentication servers, NFC tags or their associated functional modules may be implemented at least in part in the form of software. Such software is stored and executed utilizing respective memory and processor elements of at least one processing device. The system may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system.

The particular processing operations and other system functionality described in conjunction with the FIGS. 1-5 are presented by way of illustrative example only, and should not be construed as limiting the scope of the invention in any way. Alternative embodiments can use other types of processing operations for authentication. For example, the ordering of the process steps may be varied in other embodiments, or certain steps may be performed concurrently with one another rather than serially.

The foregoing examples are intended to illustrate aspects of certain embodiments of the present invention and should not be viewed as limiting in any way. Other embodiments can be configured that utilize different authentication techniques.

It is to be appreciated that the authentication and other processing functionality such as that described in conjunction with FIGS. 1-5 and the associated examples above can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

Also, the particular configuration, elements and operating parameters of the embodiments described above are not requirements of the invention, and should not be construed as limiting the scope of the invention in any way. For example, in the authentication processes described above with respect to FIGS. 1-5, various devices may initiate the authentication process. For example, in some embodiments the user device 108 may cause the user device 104 to act as an NFC initiator in establishing an NFC connection with the NFC tag 106 and begin the authentication protocol with the authentication server 102. Alternatively, the user device 108 may initiate an authentication process with the authentication server 102, which in turn causes the user device to act as an NFC initiator in establishing an NFC connection with the NFC tag 106 and begin the authentication protocol.

As another example, in some embodiments cryptographic values such as the passcode 201, long code 301, passcode 401, etc. may be bound to an identity of the primary device which utilizes the cryptographic value for authentication. A primary device such as user device 108 may initiate the authentication process by sending a request to the user device 104 or the authentication server 102. The request may contain information related to the identity of the user device 108 such that the cryptographic value derived from the shared secret established in the authentication protocol is bound to the identity of the user device 108 for added security. Those skilled in the art can make these and other modifications in the described embodiments in a straightforward manner.

Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a first processing device comprising:
near field communication (NFC) interface circuitry;
a memory; and
a processor coupled to the memory;
the first processing device being configured to:
establish an NFC connection with an NFC tag using the NFC interface circuitry;
utilize the NFC tag to perform an authentication protocol with an authentication server;
receive a shared secret, the shared secret being established between the NFC tag and the authentication server in conjunction with the authentication protocol; and
present a cryptographic value derived from the shared secret to a second processing device other than the NFC tag, the second processing device not being configured to communicate with the NFC tag;
wherein the cryptographic value is utilizable by the second processing device for authenticating to the authentication server;
wherein at least one of a length and a complexity of the cryptographic value presented to the second processing device is determined based on a mode of connection between the first processing device and the second processing device; and
wherein said at least one of the length and the complexity of the cryptographic value is greater in a connected mode than in an unconnected mode.

2. The apparatus of claim 1, wherein the first processing device further comprises a display, the first processing device being configured to present the cryptographic value on the display.

3. The apparatus of claim 1, wherein the first processing device further comprises a network interface, the first processing device being configured to present the cryptographic value by:
utilizing the network interface to establish a network connection to the second processing device; and
transmitting the cryptographic value over the network connection.

4. The apparatus of claim 3, wherein the network connection comprise a Bluetooth connection.

5. The apparatus of claim 1, wherein the cryptographic value comprises a passcode utilizable for authenticating to the authentication server.

6. The apparatus of claim 1, wherein the first processing device is configured to authenticate to the authentication server by presenting the shared secret to the authentication server.

7. The apparatus of claim 6, wherein the first processing device is configured to receive the cryptographic value from the authentication server over a secure channel established responsive to the first processing device authenticating to the authentication server.

8. The apparatus of claim 1, wherein the first processing device is configured to derive the cryptographic value from the shared secret.

9. The apparatus of claim 1, wherein the second processing device does not have NFC interface circuitry.

10. The apparatus of claim 1, wherein:
the connection mode between the first processing device and the second processing device comprises one of:
the connected mode wherein the first processing device and the second processing device are connected using a network connection and the cryptographic value is presented to the second processing device by transmitting the cryptographic value over the network connection; and
the unconnected mode wherein the first processing device and the second processing device are not connected using the network connection and the cryptographic value is presented to the second processing device by outputting the cryptographic value on a display of the first processing device.

11. The apparatus of claim 1, wherein:
the connection mode between the first processing device and the second processing device comprises one of:
a first connected mode wherein the first processing device and the second processing device are connected using a trusted network connection and the cryptographic value is presented to the second processing device by transmitting the cryptographic value over the network connection;
a second connected mode wherein the first processing device and the second processing device are connected using an untrusted network connection and the cryptographic value is presented to the second processing device by outputting the cryptographic value on a display of the first processing device; and
the unconnected mode wherein the first processing device and the second processing device are not connected using the trusted network connection or the untrusted network connection and the cryptographic value is presented to the second processing device by outputting the cryptographic value on the display of the first processing device; and
said at least one of the length and the complexity of the cryptographic value is greater in the first connected mode than in the second connected mode and the unconnected mode.

12. A method comprising:
establishing, by a first processing device, a near field communication (NFC) connection with an NFC tag;
utilizing, by the first processing device, the NFC tag to perform an authentication protocol with an authentication server;
receiving, in the first processing device, a shared secret, the shared secret being established between the NFC tag and the authentication server in conjunction with the authentication protocol; and
presenting, by the first processing device, a cryptographic value derived from the shared secret to a second processing device other than the NFC tag, the second processing device not being configured to communicate with the NFC tag;
wherein the cryptographic value is utilizable by the second processing device for authenticating to the authentication server;
wherein at least one of a length and a complexity of the cryptographic value presented to the second processing device is determined based on a mode of connection between the first processing device and the second processing device; and
wherein said at least one of the length and the complexity of the cryptographic value is greater in a connected mode than in an unconnected mode.

13. A non-transitory processor-readable storage medium having instruction code embodied therein which when executed by a first processing device causes the first processing device to:
- establish a near field communication (NFC) connection with an NFC tag;
- utilize the NFC tag to perform an authentication protocol with an authentication server;
- receive a shared secret, the shared secret being established between the NFC tag and the authentication server in conjunction with the authentication protocol; and
- present a cryptographic value derived from the shared secret to a second processing device other than the NFC tag, the second processing device not being configured to communicate with the NFC tag;
- wherein the cryptographic value is utilizable by the second processing device for authenticating to the authentication server;
- wherein at least one of a length and a complexity of the cryptographic value presented to the second processing device is determined based on a mode of connection between the first processing device and the second processing device; and
- wherein said at least one of the length and the complexity of the cryptographic value is greater in a connected mode than in an unconnected mode.

14. An apparatus comprising:
a first processing device comprising:
  a memory; and
  a processor coupled to the memory;
the first processing device being configured to:
  obtain a cryptographic value from a second processing device; and
  utilize the cryptographic value in authenticating to an authentication server;
wherein the cryptographic value is derived from a shared secret established between the authentication server and a near field communication (NFC) tag connected to a second processing device using an NFC connection, the NFC tag being distinct from the first processing device and the second processing device;
wherein the second processing device utilizes the NFC tag to perform an authentication protocol with the authentication server, the shared secret being established between the NFC tag and the authentication server in conjunction with the authentication protocol;
wherein the first processing device is not configured to communicate with the NFC tag;
wherein at least one of a length and a complexity of the cryptographic value obtained at the first processing device from the second processing device is determined based on a mode of connection between the first processing device and the second processing device; and
wherein said at least one of the length and the complexity of the cryptographic value is greater in a connected mode than in an unconnected mode.

15. The apparatus of claim 14, wherein the first processing device does not have NFC interface circuitry.

16. The apparatus of claim 14, wherein the cryptographic value comprises a passcode and utilizing the cryptographic value comprises transmitting the passcode to the authentication server.

17. The apparatus of claim 14, wherein the cryptographic value is presented on a display of the second processing device and wherein the first processing device is configured to obtain the cryptographic value by receiving input from a user.

18. The apparatus of claim 14, wherein the first processing device further comprises a network interface, the first processing device being configured to obtain the cryptographic value by:
- utilizing the network interface to establish a network connection to the second processing device; and
- receiving the cryptographic value over the network connection.

19. The apparatus of claim 18, wherein the network connection comprises a Bluetooth connection.

20. A method comprising:
- obtaining, by a first processing device, a cryptographic value from a second processing device; and
- utilizing, by the first processing device, the cryptographic value in authenticating to an authentication server;
- wherein the cryptographic value is derived from a shared secret established between the authentication server and a near field communication (NFC) tag connected to a second processing device using an NFC connection, the NFC tag being distinct from the first processing device and the second processing device;
- wherein the second processing device utilizes the NFC tag to perform an authentication protocol with the authentication server, the shared secret being established between the NFC tag and the authentication server in conjunction with the authentication protocol;
- wherein the first processing device is not configured to communicate with the NFC tag;
- wherein at least one of a length and a complexity of the cryptographic value obtained at the first processing device from the second processing device is determined based on a mode of connection between the first processing device and the second processing device; and
- wherein said at least one of the length and the complexity of the cryptographic value is greater in a connected mode than in an unconnected mode.

21. A non-transitory processor-readable storage medium having instruction code embodied therein which when executed by a first processing device causes the first processing device to:
- obtain a cryptographic value from a second processing device; and
- utilize the cryptographic value in authenticating to an authentication server;
- wherein the cryptographic value is derived from a shared secret established between the authentication server and a near field communication (NFC) tag connected to a second processing device using an NFC connection, the NFC tag being distinct from the first processing device and the second processing device;
- wherein the second processing device utilizes the NFC tag to perform an authentication protocol with the authentication server, the shared secret being established between the NFC tag and the authentication server in conjunction with the authentication protocol;
- wherein the first processing device is not configured to communicate with the NFC tag;
- wherein at least one of a length and a complexity of the cryptographic value obtained at the first processing device from the second processing device is determined based on a mode of connection between the first processing device and the second processing device; and
- wherein said at least one of the length and the complexity of the cryptographic value is greater in a connected mode than in an unconnected mode.

22. An apparatus comprising:
a first processing device comprising:
  near field communication (NFC) interface circuitry;
  a memory; and
  a processor coupled to the memory;
the first processing device being configured to:
  establish an NFC connection with an NFC tag using the NFC interface circuitry;
  utilize the NFC tag to perform an authentication protocol with an authentication server;
  receive a shared secret established between the NFC tag and the authentication server in conjunction with the authentication protocol; and
  present a cryptographic value derived from the shared secret to an authentication token other than the NFC tag, the authentication token not being configured to communicate with the NFC tag;
wherein the authentication token is configured to generate one-time passcodes from a seed value, the cryptographic value being utilizable by the authentication token for establishing the seed value;
wherein at least one of a length and a complexity of the cryptographic value presented to the authentication token is determined based on a mode of connection between the first processing device and the authentication token; and
wherein said at least one of the length and the complexity of the cryptographic value is greater in a connected mode than in an unconnected mode.

* * * * *